United States Patent
Mojaver et al.

(10) Patent No.: US 6,833,843 B2
(45) Date of Patent: Dec. 21, 2004

(54) PANORAMIC IMAGING AND DISPLAY SYSTEM WITH CANONICAL MAGNIFIER

(75) Inventors: Michael Mojaver, San Diego, CA (US); Steven Branson, San Diego, CA (US)

(73) Assignee: Tempest Microsystems, San Diego, CA (US)

( * ) Notice: Subject to any disclaimer, the term of this patent is extended or adjusted under 35 U.S.C. 154(b) by 193 days.

(21) Appl. No.: 10/005,824

(22) Filed: Dec. 3, 2001

(65) Prior Publication Data

US 2003/0103063 A1 Jun. 5, 2003

(51) Int. Cl.⁷ .......................... G09G 5/00; G06T 15/10; G06T 15/20
(52) U.S. Cl. ...................... 345/647; 345/427
(58) Field of Search ............... 345/647, 427; 348/207.99, 144

(56) References Cited

U.S. PATENT DOCUMENTS

| | | | |
|---|---|---|---|
| 5,077,609 A | * 12/1991 | Manelphe | 348/144 |
| 5,185,667 A | 2/1993 | Zimmermann | |
| 5,200,818 A | 4/1993 | Neta et al. | |
| 5,489,940 A | * 2/1996 | Richardson et al. | 348/315 |
| 5,631,778 A | 5/1997 | Powell | |
| 5,646,677 A | * 7/1997 | Reber | 725/139 |
| 5,721,585 A | 2/1998 | Keast et al. | |
| 5,818,634 A | 10/1998 | Richard et al. | |
| RE36,207 E | * 5/1999 | Zimmermann et al. | 348/207.99 |
| 6,005,611 A | 12/1999 | Gullichsen et al. | |
| 6,128,145 A | 10/2000 | Nagaoka | |
| 6,147,709 A | 11/2000 | Martin et al. | |
| 6,184,859 B1 | 2/2001 | Kojima | |
| 6,201,574 B1 | 3/2001 | Martin | |
| 6,246,413 B1 | 6/2001 | Teo | |
| 6,266,042 B1 | 7/2001 | Aratani | |
| 6,271,853 B1 | 8/2001 | Oxaal | |

* cited by examiner

Primary Examiner—Matthew C. Bella
Assistant Examiner—Aaron Richer
(74) Attorney, Agent, or Firm—Reza Mollaaghababa; Nutter McClennen & Fish, LLP

(57) ABSTRACT

The present invention provides an image acquisition and viewing system that employs a fish-eye lens and an imager, such as, a CCD array, to obtain a wide angle image, e.g., an image of a hemispherical field of view. The system of the invention further includes a primary display for displaying the image, and a secondary display for presenting a perspective-corrected view of a selected portion of the image. A processor effects correction of a selected portion of the image for distortions introduced by the fish-eye lens by utilizing methods according to the teachings of the invention. The processor further effects the display of the image and its perspective-corrected portion thereof on the primary and the secondary displays, respectively. Moreover, the processor effects the display of a graphical object on the first display to delineate the portion that is presented on the secondary display. This allows a viewer to view simultaneously the image and the perspective-corrected portion, thereby gleaning information regarding the context of the perspective-corrected portion within the entire image while viewing it.

15 Claims, 11 Drawing Sheets

PANORAMIC IMAGING AND DISPLAY SYSTEM WITH CANONICAL MAGNIFIER

BACKGROUND OF THE INVENTION

The present invention relates generally to methods and apparatus for generating a perspective corrected view of a portion of a wide angle image acquired, for example, by utilizing a fish-eye lens. More particularly, the invention provides methods and apparatus for linking the wide angle image and a perspective-corrected view of a portion of that image.

Imaging systems that utilize fish-eye lenses are known in the art. A fish-eye lens captures an image corresponding to a hemispherical, or a partially hemispherical, field of view. That is, fish-eye lenses allow imaging much-enhanced angular views relative to views obtainable by ordinary camera lenses. An image obtained by a fish-eye lens, however, contains radial distortions that need to be rectified to allow convenient viewing.

Methods and devices for selecting and undistorting a portion of a fish-eye image are also known. Such conventional methods and devices, however, suffer from a number of limitations. For example, although such conventional devices present an undistorted view of a portion of a fish-eye image, they do not allow a viewer to observe simultaneously the relation of the undistorted view to the entire image using a single imaging device. In other words, such conventional devices do not allow a viewer to observe simultaneously an undistorted view of a portion of a fish-eye image, and the remainder of that image, albeit with distortions introduced by the fish-eye lens present.

Moreover, conventional methods for undistorting a portion of a fish-eye image have a number of shortcomings. Such conventional methods can only be utilized for removing distortions from image portions corresponding to a small field of view. For example, these methods break down completely when applied to image portions corresponding to fields of view of tens of degrees, resulting in smeared images. Such limited viewing angles provided by conventional methods diminish considerably the benefits of panoramic observation of a scene.

Accordingly, there is a need for methods and apparatus for acquiring and viewing a fish-eye image that provide canonical undistortion capability, and afford enhanced flexibility for viewing portions of the fish-eye image throughout the full 180-degree field of view while compensating for distortions introduced by the fish-eye lens.

Further, there is a need for methods and apparatus which allow readily selecting a portion of a fish-eye image, generating a perspective-corrected view of the selected portion at a desired magnification without losing the benefits of panoramic aspects of viewing a scene provided by the fish-eye lens.

SUMMARY OF THE INVENTION

The present invention provides, in one aspect, a device for generating a perspective corrected view of at least a portion of a wide-angle image. More particularly, the present invention provides a device that utilizes a fish-eye lens coupled to an imager, such as, a CCD or CMOS array, a thermal imaging array or any other suitable optical imaging device, to obtain an image of a scene, for example, an image of a scene corresponding to 180-degree field of view, and displays the acquired image on a primary display. The device further allows selecting a portion of the displayed image for further viewing, at a desired magnification and with distortions introduced by the fish-eye lens substantially removed, on the primary display, or alternatively, on a secondary display.

In another aspect, a device of the invention includes an image-capturing device that generates an image, for example, in the form of a two-dimensional digital map of luminance, of a field of view. The image-capturing device can include a fish-eye lens that collects optical photons emanating from the field of view, and an imager that converts the collected optical photons to electrical signals representing an image of the field of view. This image is herein referred to for brevity as "fish-eye image". The term "fish-eye image", as used herein, refers to a hemispherical, partially hemispherical, or more broadly, to a wide-angle image of a field of view. The device of the invention can further include a processor that communicates with the image-capturing device to access the acquired image for processing, such as, removal of distortions introduced by the fish-eye lens.

In a related aspect, the processor includes a first display module that displays the fish-eye image, and further includes a second display module that displays a perspective corrected view of a portion of the image. Moreover, the processor can include a correlation module that effects the display of a graphical object on the displayed wide angle image to identify the selected portion of the image displayed in the perspective corrected view. The processor can effect the display of the fish-eye image on any suitable display, such as, in a window on a computer screen or on a television monitor. The graphical object can be, for example, in the form of a window or a magnifier glass or any other suitable visual icon, that is overlayed on, or otherwise linked to, a portion of the displayed fish-eye image that corresponds to the perspective-corrected view.

In another aspect, the processor effects the display of the fish-eye image and the graphical object associated therewith on a primary display, and presents the perspective-corrected view of a portion of the fish-eye image designated by the graphical object on the primary display, or alternatively, on a separate secondary display.

In further aspects, the processor provides a perspective-corrected view of a portion of a fish-eye image by transforming that portion according to a selected magnification and an angle for viewing a section of a hemisphere corresponding to that image portion from a vantage point offset from the center of the hemisphere by a defined distance.

For example, the processor can effect the correction of a portion of a fish-eye image by mapping a point (u,v) on an undistorted image plane representing a perspective-corrected portion of a distorted image to a point (x,y) on an image plane representing the distorted image by utilizing the following mathematical formulas according to the teachings of the invention:

$$x = R(\beta_0/(PI/2))\cos(\delta_0)$$

$$y = R(\beta_0/(PI/2))\sin(\delta_0)$$

$$t = [Dd + \sqrt{(D^2 d^2 - (u^2 + v^2 + d^2)(D^2 - 1))}]/(u^2 + v^2 + d^2)$$

$$\beta_0 = \arctan(-D\cos(\beta) + d\, t\cos(\beta) - v\, t\sin(\beta),\, 1)$$

$$\delta_0 = \arctan(-D\sin(\beta) + d\, t\sin(\beta) + vt\cos(\beta),\, ut) + d$$

where $\beta$ and $\delta$ are the zenith and azimuthal angles corresponding to the center of the undistorted image, $\beta_0$ and $\delta_0$ are the zenith and azimuthal angles corresponding to a pixel (u,v) in the undistorted image, d is the magnification factor, D is a distance of a viewing point from the center of hemisphere which correlates with the level of undistortion, and R is the radius of the fisheye image. A more detailed explanation and geometrical definition of these variables will be provided below.

In related aspects, a device of the invention as described above, further includes a user interface module coupled to the processor that allows associating the graphical object with a portion of the displayed fish-eye image, for example, by moving the graphical object to overlie that portion, in order to select that portion of the fish-eye image to be corrected for perspective distortions and to be presented, at a selected magnification, on the same or a separate display for further viewing.

In other aspects, the invention allows selecting a portion of a fish-eye image to be corrected for perspective distortions based on a pre-defined set of rules. For example, in a device of the invention as described above, the processor can be programmed, or can have access to instructions stored in a buffer, to automatically select a portion of an acquired fish-eye image for perspective correction and further viewing. Any instructions suitable for a particular application can be utilized in a device of the invention. For example, the processor may select a rectangular or a circular portion of the fish-eye image centered at a defined region of interest for perspective correction and presentation. Alternatively, the processor can periodically choose a different portion of the fish-eye image, e.g., randomly or based on a pre-defined algorithm, for viewing.

In another aspect, the processor effects the image-capturing device to acquire periodically a fish-eye image of a scene, and compares two or more images, e.g., two successive images, to detect motion, if any, of one or more objects in the field of view. The processor further effects the display of perspective-corrected views of one or more portions of the fish-eye image containing the moving objects, for example, on a secondary display area.

The following embodiments, described with reference to the drawings identified below, provide further understanding of the invention.

DETAILED DESCRIPTION

The present invention provides systems and methods for obtaining a fish-eye image, and for generating and displaying a perspective-corrected view of a portion of the fish-eye image at a selected magnification while preserving information regarding the context of the magnified portion within the entire image. As discussed in more detail below, a system of the invention advantageously allows a user to view simultaneously a fish-eye image, and a portion of the image, corresponding to any desired section of the fish-eye image, that has been corrected for distortions introduced by the fish-eye lens.

Figure 1A:
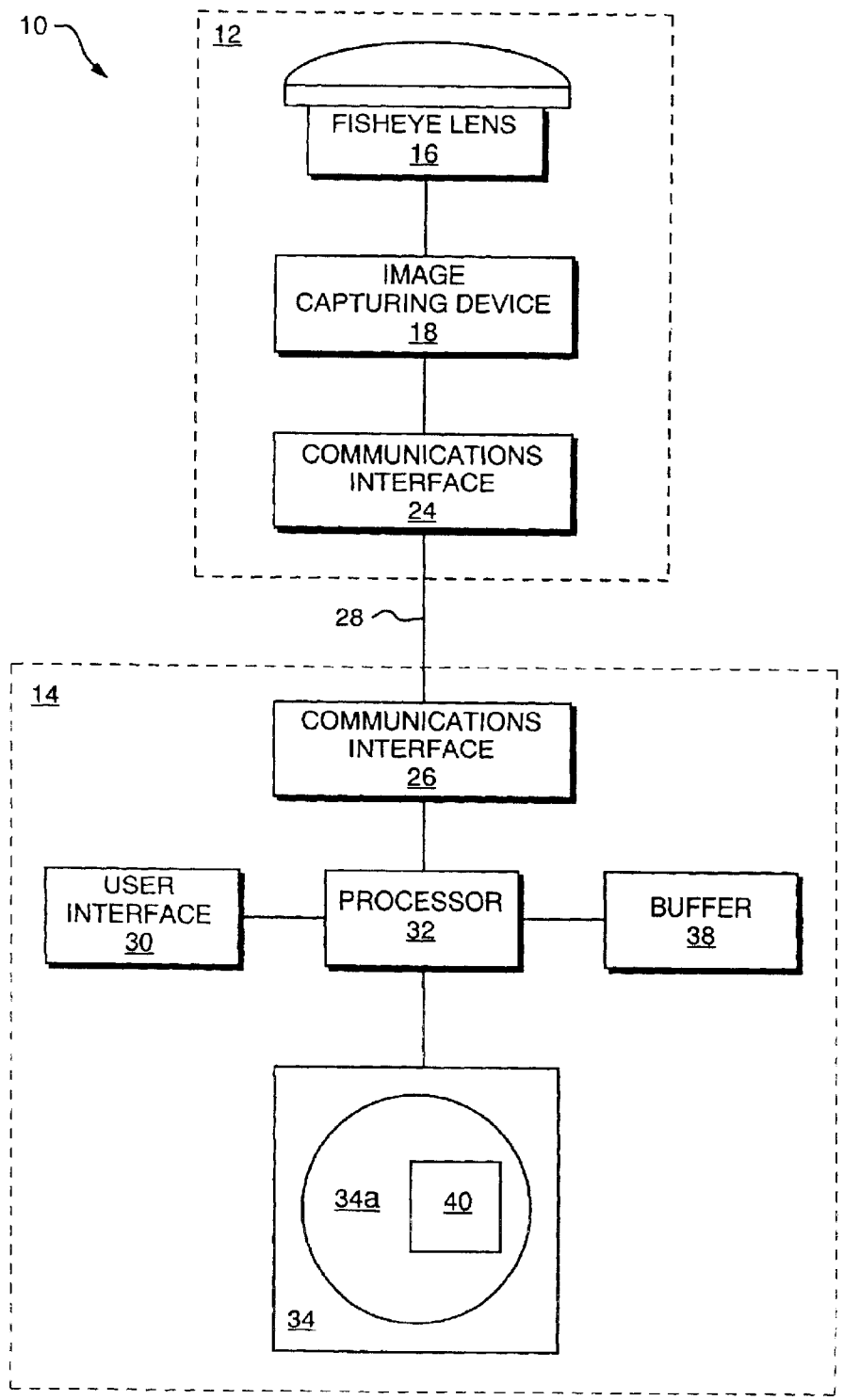
FIG. 1A is a schematic diagram of a system according to the teachings of the invention having a camera equipped with a fish-eye lens for acquiring and presenting a fish-eye image and a perspective corrected portion of that image to a viewer.
Figure 2:
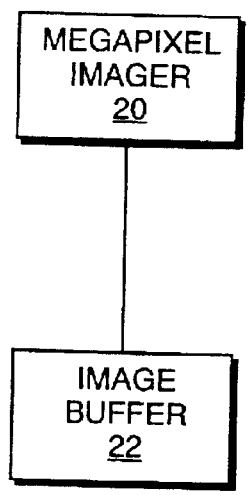
FIG. 2 is a diagram depicting various components of an exemplary embodiment of the image-capturing device of the system of FIG. 1, FIGS. 3–6 are diagrams that facilitate understanding of various steps in an exemplary embodiment of a method according to the teachings of the invention for generating a perspective-corrected view of a fish-eye image, FIG. 7 schematically depicts a mapping from a point (u,v) on an undistorted image plane to a point (x,y) on a distorted fish-eye image plane performed in accordance with the methods of the invention, FIG. 8A schematically illustrates that in one embodiment, the luminance value of a pixel on an undistorted image plane is calculated by utilizing the luminance values of four closest pixels to a point on the distorted image plane to which the pixel on the undistorted image plane is mapped, FIG. 8B schematically illustrates the weighting factors employed for the four closest pixels to a point on the distorted image plane obtained by mapping a corresponding point on the undistorted image plane to calculate a luminance value for the point on the distorted image plane.

With reference to FIGS. 1A and 2, an exemplary illustrative system 10 according to the teachings of the invention includes a camera 12 for capturing an image of a scene with a selected field of view, e.g., a 180-degree field of view, and a control and processing unit 14, which is remotely located relative to the camera 12. Although in this illustrative embodiment, the camera 12 and the control/processing unit 14 are located remotely relative to one another and communicate via a selected communication link, as described in more detail below, those skilled in the art will appreciate that in other embodiments of the invention, the camera 12 and the control/processing unit 14 can be at the same location and/or can share a single processor for their respective operations.

The illustrative camera 12 includes a fish-eye lens 16, and an image-capturing device 18. A fish-eye lens, as used herein, refers to a lens that linearly maps light rays incident thereon at azimuth angles ranging from 0 to 90 degrees to points on an image plane whose distances from an origin on the image plane span a range of 0 to 90 degrees for all polar angles. The image-capturing device 18 includes a megapixel imager 20, such as a CCD or CMOS array or other imagers known in the art and suitable for use in the present invention, and an image buffer 22. The illustrative camera 12 further includes a communication interface 24 for transmitting electrical signals signifying an image from the image-capturing device 18 to the control/processing unit 14. The communication interface 24 can utilize any suitable communication protocol, such as, Ethernet, wireless, or optical protocols, to transmit data to and receive control signal from a corresponding communication interface 26 of the control/processing unit 14 via a communication link 28.

In some embodiments of the invention, the image-capturing device 18 and the image buffer 22 are implemented as an integrated circuit device. Such devices can be obtained, for example, from Kodak Corporation of Rochester, N.Y., U.S.A. under trade designation KAC-1310 CMOS image sensor.

With continued reference to FIG. 1, the fish-eye lens 16 guides optical photons emanating from a scene within its field of view, i.e., a 180-degree field of view, onto the imager 20 of the image-capturing device 18, and the imager 20 converts the optical photons to electrical signals in a manner known in the art, and transmits the electrical signals to the image buffer 22 for storage. The imager 20 can have programmable shutter times and frame rates, and can be color or monochromatic.

The control/processing unit 14 further includes a user-interface 30, such as, a keyboard, a mouse, coupled to a processor 32, which is in turn in communication with a display 34. A user, e.g., an operator of the system 10, can utilize the user interface 30 to communicate with the processor 32 to request acquisition of an image by the camera 12 and its display on the display 34 in a manner described in more detail below. In addition, the exemplary control/processor unit 14 optionally includes a buffer 38 for storage of image date received from the camera 12.

The processor 32 responds to a request received from the user interface 14 by forwarding one or more commands to the camera 12, via the exemplary communication interfaces 26 and 24 and the communication link 28, for acquisition of an image. The request from the user interface 14 can include values of one or more parameters for acquiring an image, such as, the shutter speed and/or frame rate of the imager 20.

The camera 12 responds to the commands received from the processor 32 by acquiring an image, as described above, or retrieving a previously obtained image from the image buffer 22, and transmitting the image to the processor 32. The processor 32 optionally stores the received image in the buffer 38. Further, it effects the display of the image on the display 34. The term "display", as used herein, can refer to a device, such as, a computer monitor or a television monitor, that allows visual presentation of data, e.g., images, and it can also refer to at least a portion of a screen provided by such a device for viewing images. For example, a display can refer a computer monitor or a window provided on a computer screen.

In this embodiment, the display 34 is a graphical object, such as, a window provided on a computer screen, which presents the fish-eye image in a circular area 34a, although other forms of presentation of the image can also be utilized. In addition, the display 34 presents a graphical object 40, for example, in the form of a window or a magnifier, overlayed on a portion of the image presented in the circular area 34a. A user can utilize the user interface 30 to move the graphical object 40 to different portions of the image displayed in the area 34a in order to select a portion of the image to be corrected for distortions introduced by the fish-eye lens and to be presented for viewing in the display area confined by the graphical object 40.

More particularly, the user can select a portion of the area 34a by overlaying the graphical object 40 over that portion, and by doing so, can request perspective correction of that portion and its display within the display area circumscribed by the graphical object 40. In addition, the system of the invention permits the user to select a magnification for the display of the selected portion of the image. The selection of a desired magnification can be accomplished, for example, by rotating a knob associated with the user interface, e.g., a thumb wheel located on a computer mouse. For example, the rotation of the knob in one direction can effect a progressive increase of the magnification while rotation in the opposite direction can cause a decrease of the magnification. Alternatively, the user interface can be utilized to effect the display of a dialogue box on the display 34, in which one or more available values of magnification are listed. The user can select one of the values for viewing a perspective-corrected portion of the fish-eye image. Those skilled in the art will readily appreciate that other techniques can be utilized in a system of the invention to allow a user select a desired magnification.

Figure 1B:
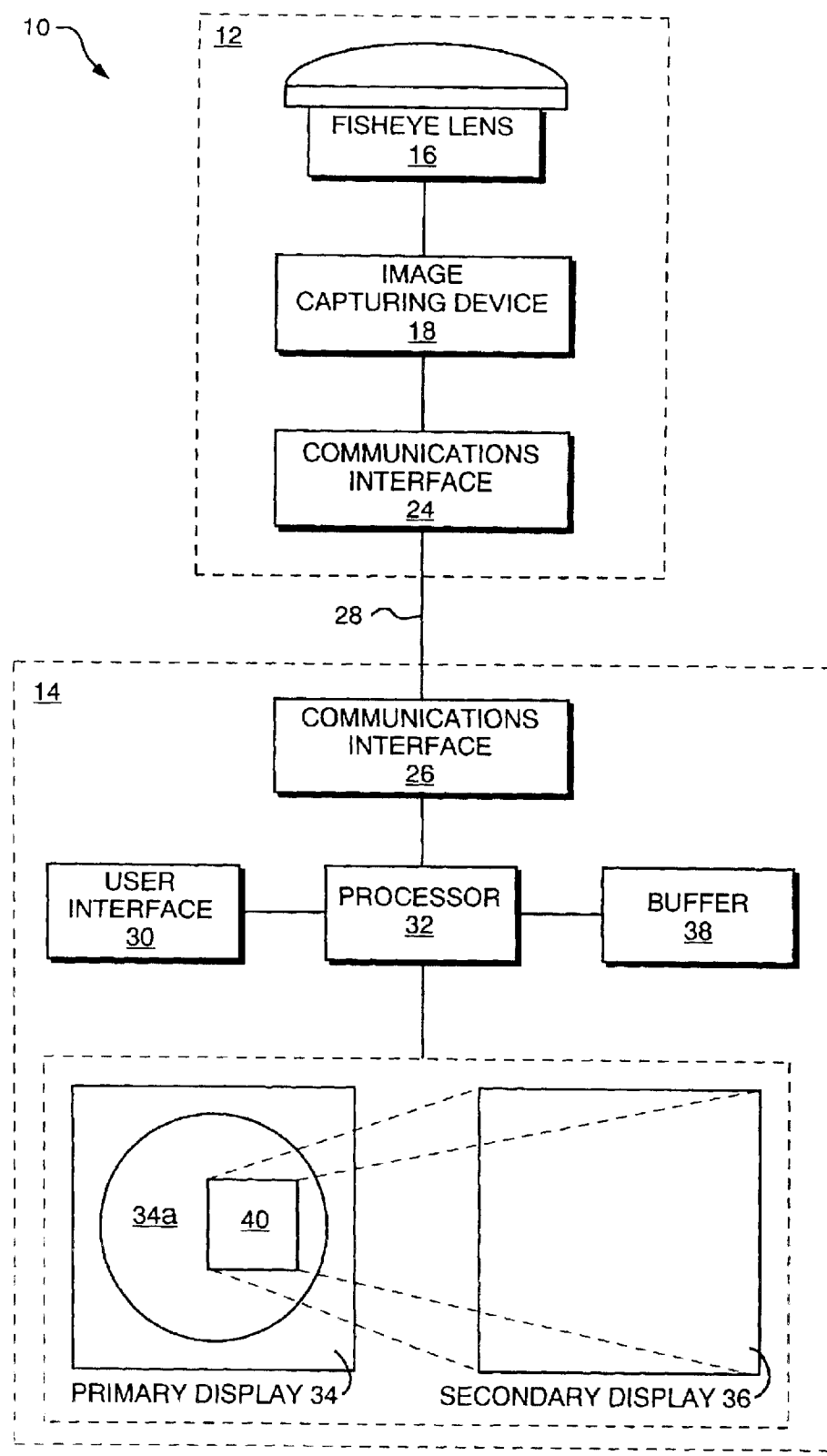
FIG. 1B is a schematic diagram of another system according to the teachings of the invention having a primary display for presenting a fish-eye image and a secondary display for presenting a perspective-corrected view of a selected portion of the displayed fish-eye image.

In another embodiment shown in FIG. 1B, the control/processing unit 14 includes, in addition to the display 34, another display 36 that is also in communication with the processor 32. In this embodiment, the processor 32 effects the display of a perspective-corrected view of a portion of the image presented in the display 34, which is selected by the graphical object 40, on the display 36. In other words, in this embodiment, the display 34 functions as a primary display for presenting the fish-eye image captured by the camera 12, and the associated graphical object 40, while the display 36 functions as a secondary display for presenting the perspective-corrected view of the portion of the fish-eye image selected by the graphical object 40.

In another embodiment, the graphical object 40 can be in the form a cross-hair that can be selected, for example, by clicking on it, to effect the display of a perspective-corrected view of a pre-defined portion of the fish-eye image, for example, a circular portion with a pre-defined radius surrounding the cross-hair. This perspective-corrected view can be displayed, for example, on a secondary display, such as, the above display 36.

The size of the graphical object 40 can be optionally modified, via the user interface 30, to encompass larger or smaller portions of the display area 34a associated with the fish-eye image. For example, the graphical object 40 can be enlarged to encompass the entire fish-eye image.

The control/processor unit 14 can be implemented, for example, on various computer platforms, for example, platforms having windowing environments, such as, Microsoft Windows, Unix X Windows, and any other suitable environment.

Referring again to FIG. 1, the processor 32 responds to the selection of a portion of the fish-eye image displayed in the display 34, via the graphical object 40, by accessing that portion of the image from the buffer 38. Further, the processor 32 corrects the selected portion of the image for geometrical distortions introduced by the fish-eye lens by utilizing methods according to the teachings of the invention, as described in detail below. The various steps of a method of the invention for correcting a fish-eye image for geometrical distortions introduced by a fish-eye lens can be implemented in hard-ware or soft-ware. For example, any suitable programming language, such as, Java, C, C++, Fortran, Verilog, VHDL and standard programming practices can be utilized to implement a method of the invention, embodied in the equations described below, in software.

Figure 3:
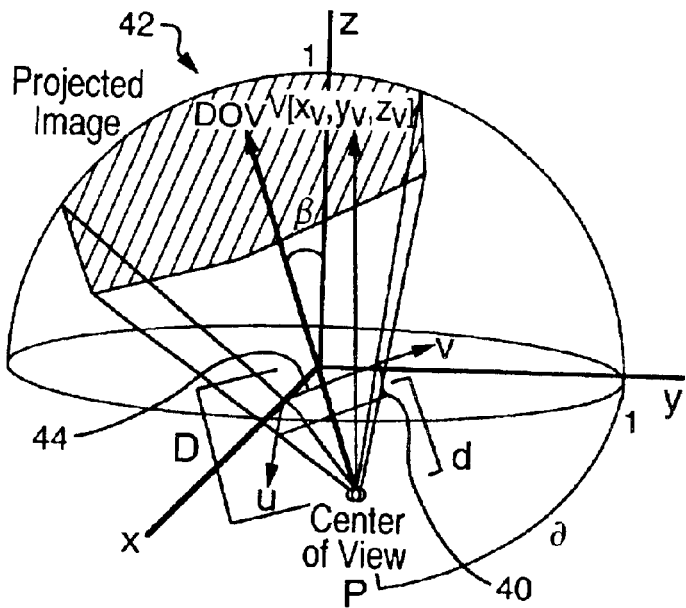

In particular, FIG. 3 depicts a coordinate reference frame (XYZ) for a hemispherical field of view that can be imaged by a fish-eye lens. FIG. 3 further illustrates a rectangular image plane 40, spanned by vectors u and v, on which an undistorted image of a portion 42 of the hemisphere viewed from a point P, which is offset from the center of the hemisphere by a defined distance D, is projected. More particularly, the portion 42 of the hemisphere is viewed from the point P along a direction of view (DOV) defined by a zenith angle $\beta$ relative to the z-axis, and an azimuth angle $\delta$, measured from the y-axis to the x-axis. The unit radius hemisphere is merely a visual aid which facilitates conversions between Cartesian and spherical coordinate systems as a point (u,v) on the undistorted image plane is mapped to a corresponding point (x,y) in the distorted fisheye image. The method described below maps a point (u,v) in the undistorted image plane to a point $(x_v,y_v,z_v)$ on the surface of the sphere according to the properties of perspective projection. The point $(x_v,y_v,z_v)$ is then converted to sperical coordinates, with radius 1, zenith angle $\beta_0$ and azimuthal angle $\delta_0$. A corresponding point (x,y) on the distorted fisheye image plane can then be easily computed by utilizing $\beta_0$ and $\delta_0$ according to the properties of the fisheye lens.

The distance of the observation point P from a center 44 of the image plane 40 is defined by a parameter d. Moving the observation point P away from the image plane 40, that is, increasing the magnitude of d, results in increasing the magnification of the undistorted image on the image plane 40. Conversely, moving the point P towards the image plane 40 results in a decrease in the magnification of the undistorted image. Given a fixed size uv-plane image (e.g. 640× 480 pixels) increasing d decreases the angular view of the surface of the sphere subtended by the uv-plane, effectively zooming in on the point centered at the DOV. Further, increasing the distance of the observation point P from the center of the hemisphere, i.e., the origin of the XYZ coordinate system, results in a decrease in the level of un-distortion. Setting D to zero results in the conventional fisheye undistortion equations, as it places the center of view used in the perspective projections in the same place as the fisheye lens. Unfortunately, utilizing such a conventional approach would require an infinitely large uv-plane to map the entire fisheye image, resulting in an enormous loss of resolution relative to that of the original fisheye image when attempting to undistort even modest portions of the fisheye image. Setting D to infinity results in a parallel projection from the sphere to the uv-plane, easily capturing the whole fisheye image with a small uv-plane, but leaving the image highly distorted. Utilizing values between 0 and infinity, as taught by the present invention, provides intermediate results.

The mathematical formulations in accord with the teachings of the invention, which follow, provide a mapping between a point (u,v) on the image plane onto a point $(x_v,y_v,z_v)$ on the hemisphere. The point $(x_v,y_v,z_v)$ corresponds to the intersection of a vector V, which originates at the center of view, i.e., point P, and passes through the point (u,v), with the hemisphere.

$$y=-D \sin(\beta)\sin(\delta)$$
$$z=-D \cos(\beta)$$

where $(\delta,\beta,D)$ represents the spherical coordinates of the point P. These Cartesian coordinates can be also be represented by the following vector notation:

$$[-D \sin(\beta)\cos(\delta), -D \sin(\beta)\sin(\delta), -D \cos(\beta)].$$

Because of the presence of rotational symmetry about the z-axis, without any loss of generality, the remainder of the mathematical derivation can be readily described by initially rotating the center point P and its associated image plane 40 and the ancillary vectors DOV and V about the z-axis by "$-\delta$" degrees such that point P lies on the x-axis and has the following coordinates:

$$[0, -D \sin(\beta), -D \cos(\beta)].$$

The above rotation causes the u-axis to align with the x-axis. Further, the rotated v-axis has a component along the y-axis and another component along the z-axis.

Figure 4:
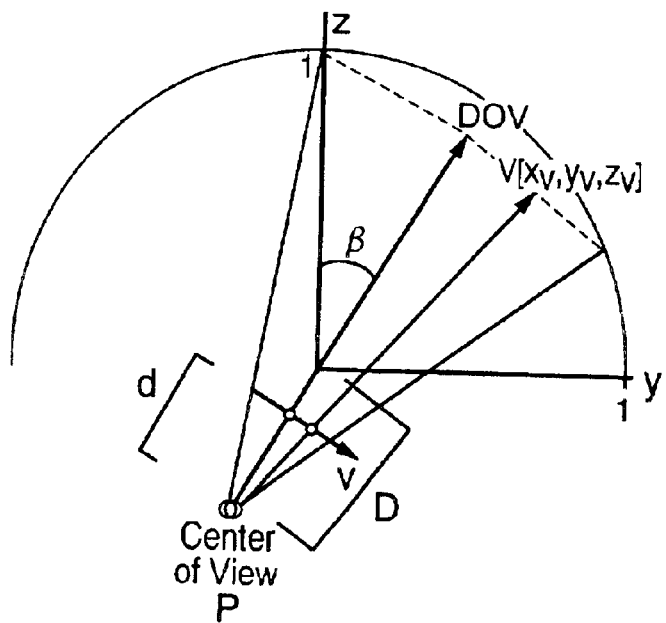
Figure 5:
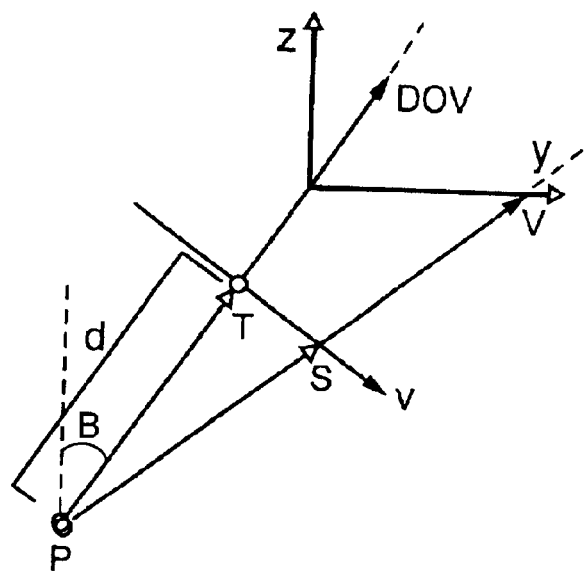

The coordinates of the vector V $(V[x_v,y_v,z_v])$ can be calculated by reference to FIG. 4, which is a two-dimensional view of the z-y plane subsequent to the above rotation depicting the center of view P, the v-axis of the (u,v) image plane, and the vectors DOV, and V emanating from the point P, and FIG. 5, which depicts a number of vector relationships discerned from the diagram of FIG. 4. More particularly, the coordinates of the vector V $(V[x_v,y_v,z_v])$ can be obtained by adding the coordinates of the point P to those of a vector tS, obtained by multiplication of a scalar quantity "t" by a vector S, signifying a directional component of the vector V, as shown below:

$$V=P+tS \qquad \text{Eq. (1).}$$

S is define as:

$$S=T+u+v \qquad \text{Eq. (2).}$$

Where T is a directional vector of length d pointing in the direction of DOV. Thus, $$T=[0, d \sin(\beta), d \cos(\beta)], \qquad \text{Eq. (3)}$$

and $$S=T+u+v \qquad \text{Eq. (4a)}$$

$$S=[u, d \sin(\beta)+v \cos(\beta), d \cos(\beta)-v \sin(\beta)] \qquad \text{Eq. (4b)}$$

By utilizing Eq(1), Eq(2), Eq. (3), Eq. (4a) and Eq. (4b), the coordinates of $V[x_v,y_v,z_v]$ are obtained as follows:

$$V=[u\ t, -D \sin(\beta)+d\ t \sin(\beta)+vt \cos(\beta), -D \cos(\beta)+d\ t \cos(\beta)-v\ t \sin(\beta)] \text{ Eq. (5).}$$

Accordingly, the $[x_v,y_v,z_v]$ coordinates of the vector V are given as follows:

$$x_v=u\ t \qquad \text{Eq. (6a)}$$

$$y_v=-D \sin(\beta)+d\ t \sin(\beta)+vt \cos(\beta) \qquad \text{Eq. (6b)}$$

$$z_v=-D \cos(\beta)+d\ t \cos(\beta)-v\ t \sin(\beta) \qquad \text{Eq. (6c)}$$

The coordinate $[x_v,y_v,z_v]$ at the intersection of the vector V with the hemisphere satisfies the following relation:

$$x_v^2+y_v^2+z_v^2=1, \qquad \text{Eq. (7).}$$

By substituting $x_v$, $y_v$, and $z_v$ from Eqs. (6a)–6(c) into Eq. (7), the following relation is obtained:

$$[u\ t]^2+[-D \sin(\beta)+d\ t \sin(\beta)+vt \cos(\beta)]^2+[-D \cos(\beta)+d\ t \cos(\beta)-v\ t \sin(\beta)]^2=1 \qquad \text{Eq. (8).}$$

Simple algebraic manipulations can be employed to obtain the following relation for the scalar t from the above Eq. (8):

$$t=[-B+/-\text{sqrt}(B-4AC)]/(2A) \qquad \text{Eq. (9).}$$

where $A=u^2+v^2+d^2$; $B=-2D\ d$ and $C=D^2-1$.

The larger value of t is chosen because the other value corresponds to the intersection of the vector V with the portion of the sphere below the x-y plane, which is not captured by the fisheye image. Hence, the scalar parameter t is given by the following relation:

$$t=[-B+\text{sqrt}(B-4AC)]/(2A) \qquad \text{Eq. (10)}.$$

Accordingly, the above equation (10), in combination with Equations 6(a)–6(c), provide the coordinates of the point of intersection of the vector V, herein referred to as $[x_v, y_v, z_v]$, with the hemisphere as follows:

$$x_v=u[-B+\text{sqrt}(B-4AC)]/(2A)$$

$$y_v=-D\sin(\beta)+d\sin(\beta)[-B+\text{sqrt}(B-4AC)]/(2A)+v\cos(b\beta)[-B+\text{sqrt}(B-4AC)]/(2A)$$

$$z_v=-D\cos(\beta)+d\cos(\beta)[-B+\text{sqrt}(B-4AC)]/(2A)-v\sin(\beta)[-B+\text{sqrt}(B-4AC)]/(2A)$$

The zenith angle $\beta_0$ and azimuth angle $\delta_0$ of this point can be obtained as follows $$\beta_0=\arctan(z_v, 1) \qquad \text{Eq. (11a)}.$$

$$\delta_0=\arctan(y_v, x_v) \qquad \text{Eq. (11b)}.$$

To undo a rotation by an angle "–δ" introduced above, a rotation angle δ can be added to $\delta_0$ to obtain the zenith and azimuth angles of the intersection of the vector V with the hemisphere prior to introducing the rotation, as follows:

$$\beta_0=\arctan(z_v, 1) \qquad \text{Eq. (12a)}.$$

$$\delta_0=\arctan(y_v, x_v)+\delta \qquad \text{Eq. (12b)}.$$

The above equations (12a) and (12b) provide the zenith angle ($\beta_0$) and the azimuth angle ($\delta_0$) of a ray of light striking the point (u,v) on the uv-plane given a direction of view represented by the zenith angle (β) and the azimuth angle (δ).

Figure 6:
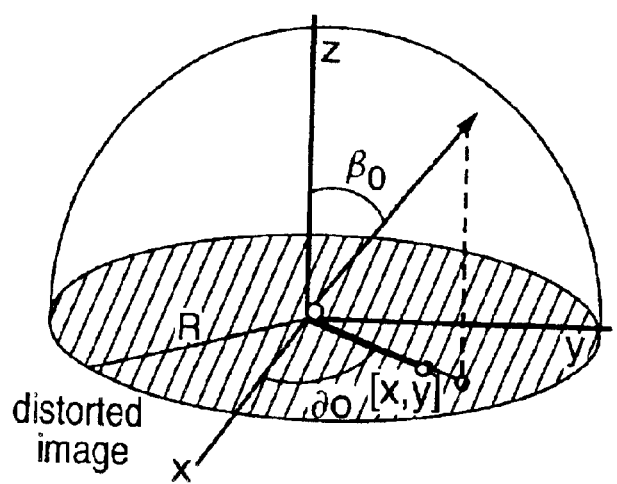

The above angles can be utilized to calculate the location of the point (x,y) on the distorted fish-eye image plane by employing the properties of a fish-eye lens. In particular, with reference to FIG. 6, one property of an ideal fish-eye lens is that a distance r of a point [x,y] on a distorted fish-eye image from the center of the image is linearly proportional to the zenith angle $\beta_0$ of the corresponding ray of light entering the fish-eye lens to be imaged at the point [x,y]. More particularly:

$$r=R(\beta_0/(PI/2)) \qquad \text{Eq. (13)},$$

where R is the radius of the distorted fish-eye image. The second property of the ideal fisheye lens is rotational symmetry, which signifies that r and δ are independent from one another. Accordingly, a conversion from polar to Cartesian coordinates provides the coordinate (x,y) in the distorted fish-eye image plane as follows:

$$x=r\cos(\delta_0)=R(\beta_0/(PI/2))\cos(\delta_0) \qquad \text{Eq. (14a)}$$

$$y=r\sin(\delta_0)=R(\beta_0/(PI/2))\sin(\delta_0) \qquad \text{Eq. (14b)}$$

Figure 7:
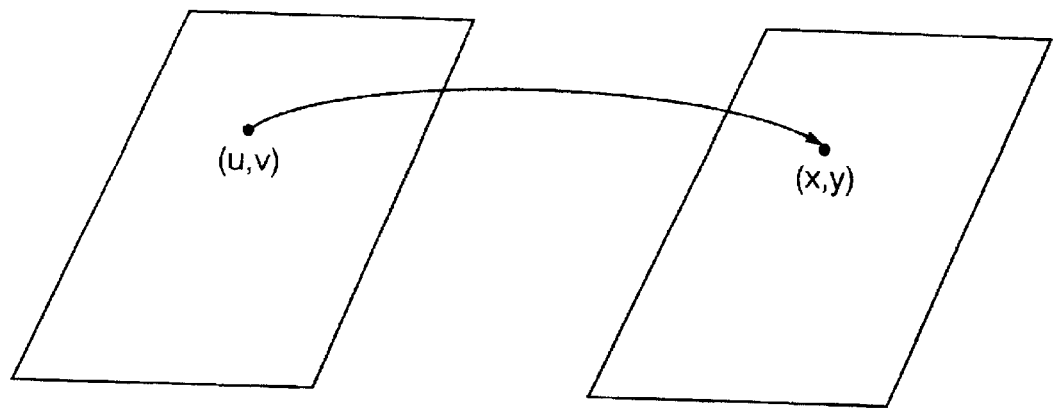

With reference to FIG. 7, the above equations (14a) and (14b) provide a mapping between a point (u,v) on the undistorted image plane, for a given set of values of D and d, and viewing angles β and δ, and a point (x,y) on the distorted image plane. More particularly, for each point (u,v) on the image, and a set of values for D,d, and viewing angles β and δ, the coordinates of a corresponding point (x,y) on the distorted image plane can be calculated by utilizing the following formulas:

$$t=[D\ d+\text{sqrt}(D^2d^2-(u^2+v^2+d^2)(D^2-1))]/(u^2+v^2+d^2) \qquad \text{Eq. (15)}$$

$$\beta_0=\arctan(-D\cos(\beta)+d\ t\cos(\beta)-v\ t\sin(\beta), 1) \qquad \text{Eq. (16)}$$

$$\delta_0=\arctan(-D\sin(\beta)+d\ t\sin(\beta)+vt\cos(\beta), u\ t)+\delta \qquad \text{Eq. (17)}$$

$$x=R(\beta_0/(PI/2))\cos(\delta_0) \qquad \text{Eq. (18)}$$

$$y=R(\beta_0/(PI/2))\sin(\delta_0) \qquad \text{Eq. (19)}$$

In many embodiments of the invention, including the exemplary embodiment described above, the distorted fish-eye image is obtained, via the imager 20 (FIG. 1), as a digital map of luminance. For example, a CCD array converts optical photons collected by the fish-eye lens into electrical signals represented by a two-dimensional array of pixels. Accordingly, in the above equations (15)–(19), the parameters (x, y), representing the coordinates of a point in the distorted image plane, and R, representing the distance of the point (x,y) from the origin of the distorted image plane, will be defined in units of pixels.

Figure 8A:
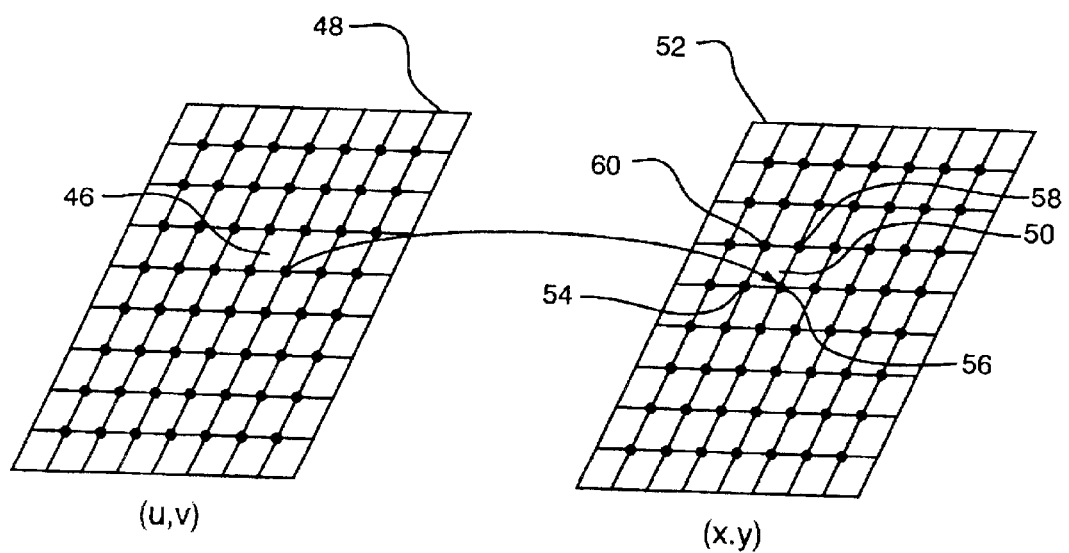
Figure 8B:
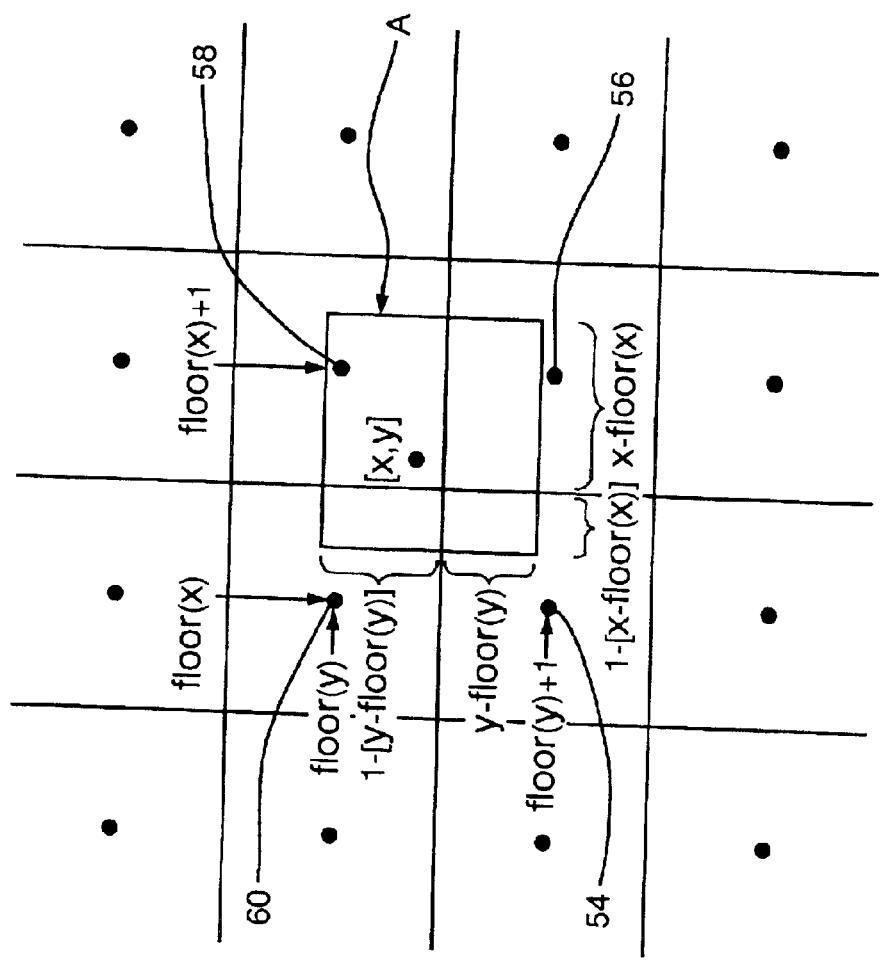

As shown in FIG. 8A, the application of the above mapping equations to an exemplary point 46 on the undistorted (u,v) image plane, represented by a two dimensional array of pixels 48, can typically result in obtaining a corresponding point 50 on the distorted (x,y) image plane, represented by a two dimensional array of pixels 52, that does not correspond to any of the pixels representing the distorted image. That is, in general, the coordinates (x,y), as computed by the above equations, will be a decimal number rather than a discrete integer corresponding to a pixel. In some embodiments, x and y are rounded off to the nearest pixel. A more preferred approach is to calculate a weighted average of luminance values of the four closest pixels to the point (x,y), for example, a weighted average of luminance values of pixels 54, 56, 58 and 60 for point 52. More particularly, with reference to FIG. 8B, a linearly weighted pixel $P_i$ can be calculated as follows:

$$\begin{aligned}P_i =\ & \text{CCDi}[\text{floor}(y)][\text{floor}(x)](1-(y-\text{floor}(y))) \\ & (1-(x-\text{floor}(x)))+\text{CCDi}[\text{floor}(y)][\text{floor}(x)+1] \\ & (1-(y-\text{floor}(y)))(x-\text{floor}(x))+ \\ & \text{CCDi}[\text{floor}(y)+1][\text{floor}(x)](y-\text{floor}(y)) \\ & (1-(x-\text{floor}(x)))+\text{CCDi}[\text{floor}(y)+1] \\ & [\text{floor}(x)+1](y-\text{floor}(y))(x-\text{floor}(x))\end{aligned} \qquad \text{Eq. (20)}$$

where floor(y) and floor(x) are functions that round-off values of x and y. That is (floor(x), floor(y)) corresponds to the coordinates of one of the four closest pixels, e.g., pixel 60, and (floor(y), floor(x)+1), (floor(y)+1, floor(x)), and (floor(y)+1, floor(x)+1) correspond to the coordinates of the other three pixels, e.g., pixels 54, 56, and 58. The function floor(x) can be defined as the greatest integer that is less than or equal to x, e.g. floor(3.14159)=3, and floor (–3.14159)=–4. The subscript (i) in $P_i$ indicates that the above equation (20) can be applied separately to red, green, and blue pixels for a color image.

Further, CCD[IMAGE_HEIGHT][IMAGE_WIDTH] is an array that provides luminance values of the distorted image pixels. Thus, the above Equation (20) provides a weighted average of the luminance values of the pixels surrounding the point (x,y), where the weight of each pixel relates an area of a portion of a box A surrounding the point (x,y) which lies within an area spanned by that pixel.

A method of the invention for transforming at least a portion of a distorted image of a scene obtained by a fish-eye lens to compensate for distortions introduced by the lens provides a number of advantages over conventional transformations. In particular, one such conventional transformation transforms the image in accordance with a defined magnification and angles for viewing a portion of hemispherical field of view from the center of the hemisphere. An undistorted image obtained by utilizing such a conventional method exhibits progressively less resolution at points farther away from the center of the image. In fact, application of such conventional methods for undistorting even modest portions of a fish-eye image results in severe loss of resolution at points of the corrected image corresponding to edges of the undistorted image. In other words, such a conventional undistorted image is increasingly stretched out as the viewing point moves towards the edges of a fish-eye image.

Figure 9A:
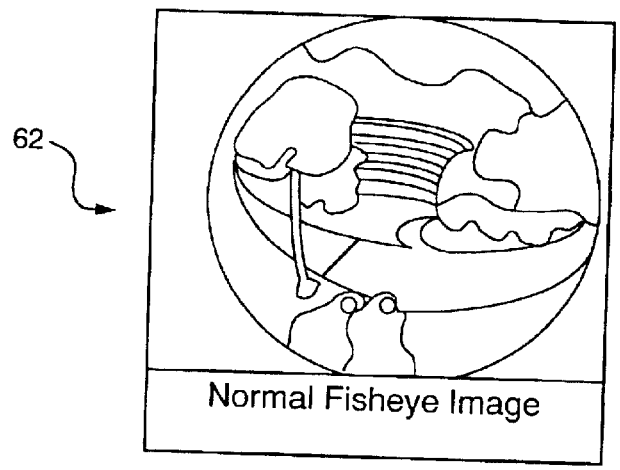
FIG. 9A illustrates an image obtained by a fish-eye lens.
Figure 9B:
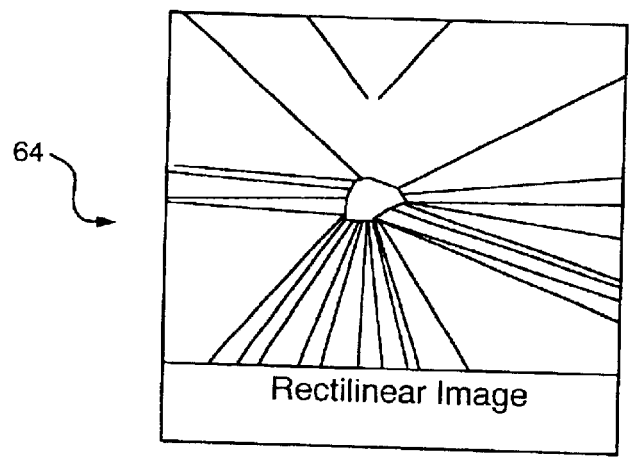
FIG. 9B illustrates the image of FIG. 9A corrected for perspective distortions introduced by the fish-eye lens by utilizing a conventional correction method.
Figure 9C:
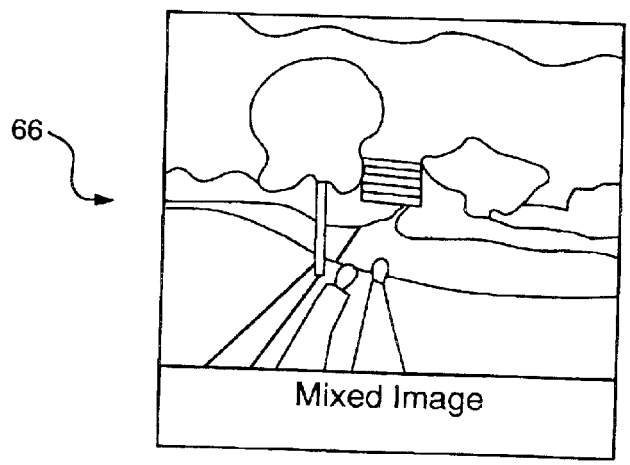
FIG. 9C illustrates the image of FIG. 9A subsequent to applying the method of the invention for correcting distortions introduced by the fish-eye lens.

To further illustrate the advantages of the undistortion method of the invention, FIGS. 9A, 9B and 9C depict a distorted fish-eye image 62, a rectilinear image 64 obtained by applying conventional transformations to the image 62 for correcting perspective distortions, and a perspective-corrected image 66 obtained by applying the transformations according to the teachings of the invention to the fish-eye image 62. A comparison of the image 64 with the image 66 clearly illustrates that correcting a distorted image, obtained by a fish-eye lens, for perspective distortions in accordance with the teachings of the invention, as described above, results in a perspective-corrected image that is significantly enhanced in fidelity relative to an undistorted image obtained by employing conventional techniques.

As discussed above, the present invention presents a perspective-corrected view of a portion of an image obtained by a fish-eye lens while providing information regarding the context of the corrected portion relative to the entire image. For example, a system of the invention can be utilized to view in real-time an entire fish-eye image, and one or more portions thereof that have been corrected for perspective distortions introduced by the fish-eye lens.

Figure 10:
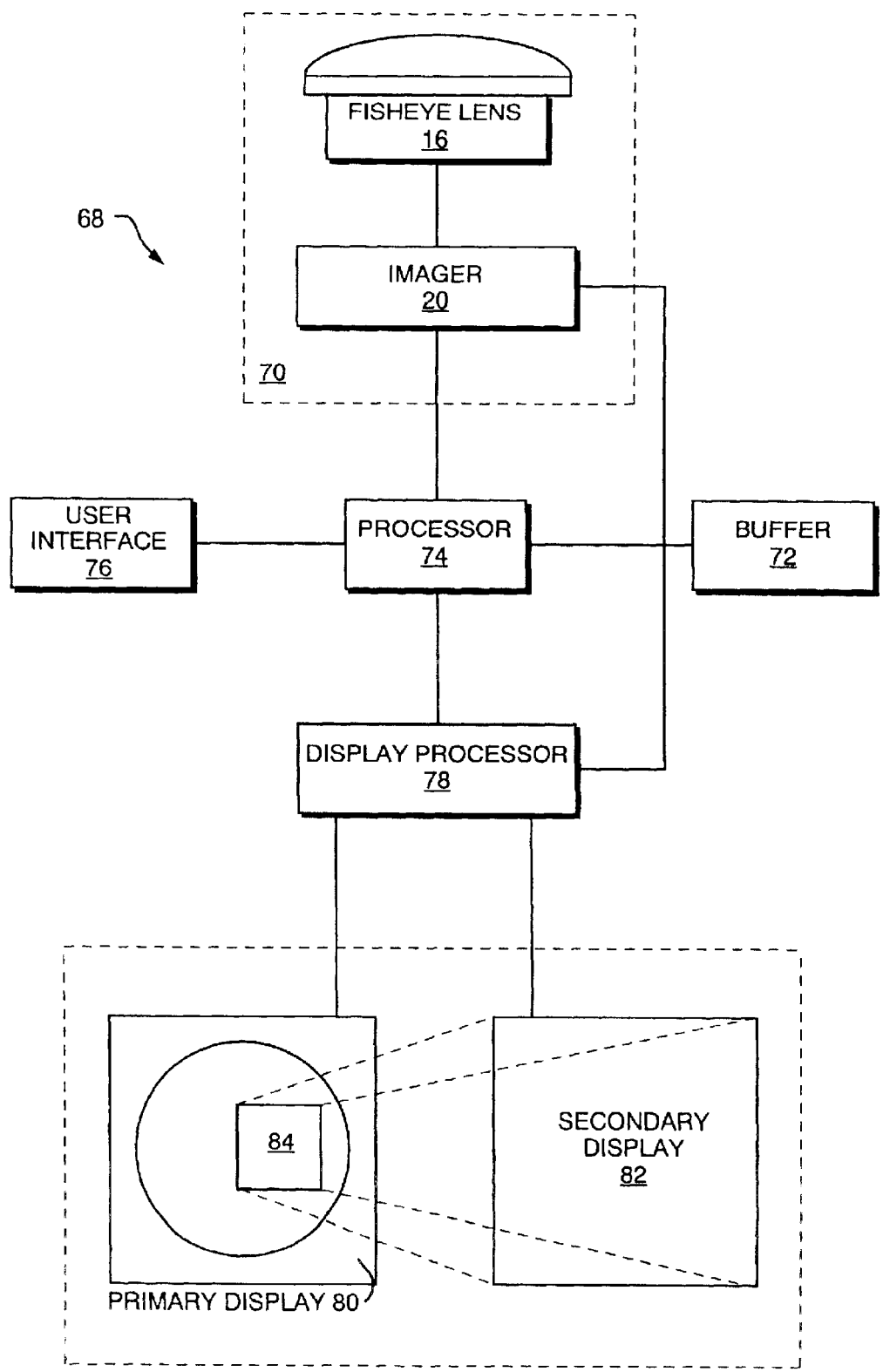
FIG. 10 is a diagram depicting another embodiment of an imaging and display system according to the teachings of the invention, FIG. 11 schematically illustrates exemplary primary and secondary displays and their respective buffers utilized in one embodiment of a system according to the teachings of the invention.

These teachings of the invention can be implemented in a variety of different embodiments, such as the exemplary embodiments described above. To further illustrate the wide applicability of the invention and the wide range of choices for implementation thereof, FIG. 10 illustrates an alternative system 68 according to another embodiment of the invention for providing a perspective corrected view of a portion of an image obtained by a fish-eye lens. Similar to the system 10 described above, the system 68 includes a fish-eye lens 16 and an imager 20 which form an image acquisition module 70 for obtaining a fish-eye image, for example, in the form of a two-dimensional array of pixels that represent the image as a digital map of luminance.

A buffer 72 stores the array of pixels representing the image, and a user interface 76, coupled to a processor 74, allows a user to request acquisition of an image and/or viewing of a portion of a previously acquired image at a defined magnification and with correction for distortions. For example, the processor 74 responds to a request for acquisition of an image of a scene by effecting the image acquisition module 70 to obtain an image of the scene, and further effects the storage of this image, which corresponds to a distorted image of the scene, in the buffer 72.

With continued reference to FIG. 10, the exemplary system 68 includes a display processor 78 that effects the display of the fish-eye digital image on a primary display 80. The display processor 78 further effects the display of a graphical object 84, overlayed on the fish-eye image, on the primary display 80. The graphical object 84 allows a user to select a portion of the image to be viewed with corrections for distortions introduced by the fish-eye lens and at a defined magnification. The graphical object 84 can be in the form of a magnifier glass through which a portion of the underlying image is visible.

The user can move the graphical object 84, via commands entered through the user interface 76, to various portions of the underlying image to select a portion of the image for viewing. In one embodiment, once the graphical object 84 is placed over a portion of the fish-eye image, the user transmits a command via the user interface 76, e.g., via a click of a mouse, to select that portion. In another embodiment, the placement of the graphical object 84 over a portion of the fish-eye image automatically effects the selection of that portion for further viewing. Upon selection of a portion of the fish-eye image for further viewing, the display processor 78 utilizes the mathematical methods of the invention described above to correct the selected portion for distortions introduced by the fish-eye lens. In addition, the display processor 78 effects the display of the perspective-corrected portion on a secondary display 82. Similar to the previous embodiment, a user can modify the magnification of the image portion presented on the secondary display 82 by providing commands via the user interface 76.

Accordingly, a user can view at a glance not only a perspective-corrected portion of interest in the distorted image but also the relationship of this portion relative to the remainder of the distorted image. In other words, the exemplary system 68, similar to the previous embodiment, provides a perspective corrected view of at least a portion of the image obtained by a fish-eye lens while preserving the information regarding the context of that portion relative to the entire image.

Figure 11:
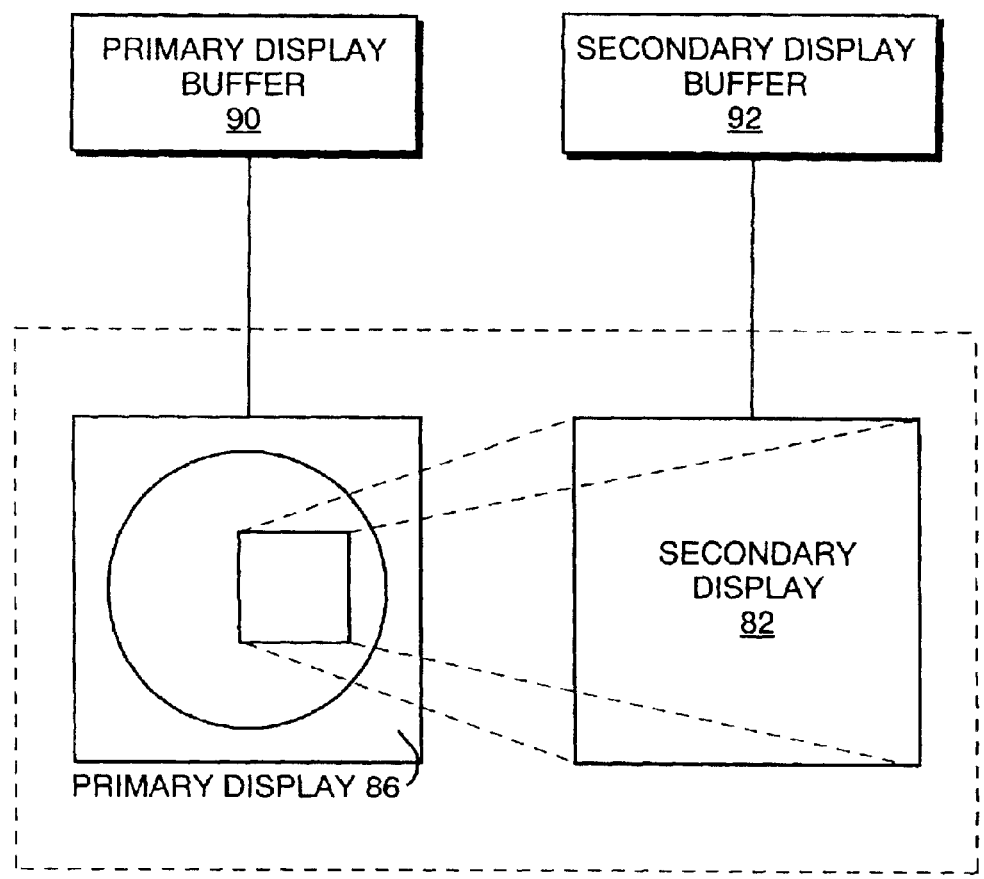

As discussed above, a variety of display devices can be utilized in a system of the invention. Such display devices can include, but are not limited to, computer monitors, liquid crystal displays (LCD), and television monitors. By way of example, FIG. 11 illustrates a partial view of a system of the invention having two television monitors 86 and 88 that function as primary and secondary displays, respectively. The monitors 86 and 88 are associated with primary and secondary display buffers 90 and 92, respectively. The display buffers 90 and 92 store the fish-eye image or a perspective-corrected portion thereof for presentation on the primary and second displays 86 and 88, respectively.

In the embodiments described above, a user selects a portion of a displayed fish-eye image, e.g., via a user interface, for viewing at a selected magnification and with corrections for distortions introduced by the fish-eye lens. It should be understood that the selection of a portion of a fish-eye image for further viewing in a device of the invention can also be accomplished automatically, for example, based on a pre-programmed set of rules or based on detecting motion of an object in the field of view, as described in more detail below.

Figure 12:
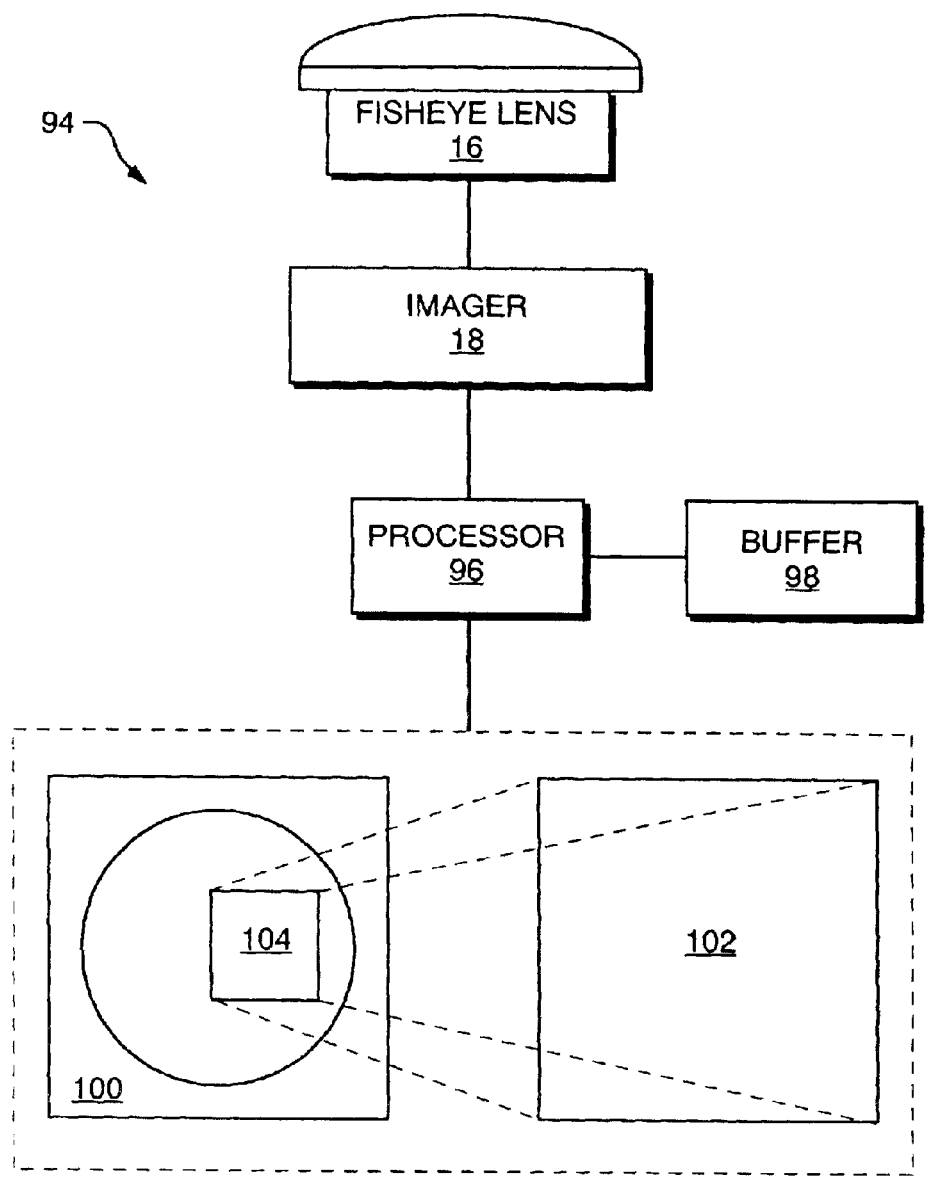
FIG. 12 is a block diagram schematically depicting another embodiment of an imaging and display system according to the teachings of the invention.

By way of example, FIG. 12 illustrates another system 94 according to the invention that includes the fish-eye lens 16 and the imager 20 for acquiring an image of a scene with a 180-degree field of view. A processor 20 receives the acquired image from the imager 18, and stores the acquired image in a buffer 98. In addition, the processor 96 effects the display of the fish-eye image on a primary display 100.

In this exemplary embodiment, the processor 96 utilizes a set of pre-defined rules, stored, for example, in the buffer 98 as a set of instructions, to select a portion of the image to be corrected for perspective distortions and to be displayed on the secondary display 102 at a selected magnification. The processor 96 effects the application of the above mathematical operations according to the invention to the selected portion to correct that portion for perspective distortions introduced by the fish-eye lens. Moreover, the processor 96 effects the display of the selected portion, with distortions removed, on the secondary display 102.

The processor 96 can automatically select a portion of the distorted fish-eye image, displayed on the primary display 100, based on any desired pre-defined criteria. For example, in one embodiment, the processor 96 selects a square central portion of the distorted image, such as, a portion 104, for display on the secondary display 102. In another embodiment, the processor 96 periodically, for example, once every few minutes, effects the acquisition of a fish-eye image of a scene and its display on the primary display 100. In addition, the processor 96 compares a newly acquired fish-eye image with a previous one to determine whether the position of one or more objects in the field of view has changed during the time elapsed between the acquisition of the two images. If the motion of an object is detected, the processor 96 selects a portion of the newly acquired image, or the previous image, that contains the moving object for viewing on the secondary display 102. That is, the processor 96 corrects that portion for perspective distortions, as described above, and displays the corrected image with a pre-defined magnification on the secondary display 102.

Those skilled in the art will appreciate that various modification can be made to the embodiments described above without departing from the scope of the present invention. For example, a variety of image capture devices can be utilized in different embodiments of the invention. In fact, in many embodiments of the invention, any image capture device that produces a digital image of a scene at a desired resolution can be employed.

What is claimed is:

1. A device for providing a perspective-corrected view of at least a portion of a wide angle image, comprising:
    an image-capturing device having a fish-eye lens for generating the wide angle image as a projection of at least a section of a viewing hemisphere associated with the lens onto an image plane,
    a processor coupled to the image capturing device that receives the image, the processor further comprising:
    a first display module for displaying the wide angle image, and
    a second display module for displaying a perspective-corrected view of portion of the image,
    the processor further comprising a correlation module for displaying a graphical object on the displayed wide angle image that identifies the selected portion of the image displayed in the perspective-corrected view,
    wherein the processor generates said perspective-corrected view from a vantage point offset relative to a center of said viewing hemisphere.

2. The device of claim 1, wherein the processor further comprises a scale adjuster that applies to said perspective-corrected view a user-adjustable magnification.

3. The device of claim 2, wherein the processor generates the perspective-corrected view of a portion of the image by transforming that portion according to a defined magnification and an angle for viewing a section of the hemisphere corresponding to that image portion from said offset vantage point.

4. The device of claim 1, further comprising a user interface module coupled to the processor for selecting a portion of the image to be displayed as a perspective corrected view.

5. The device of claim 4, wherein the user interface allows selecting a magnification for viewing the perspective-corrected portion of the image.

6. The device of claim 1, wherein the wide angle image is a fish-eye image.

7. The device of claim 6, wherein the image-capturing device further comprises an imager coupled to the fish-eye lens for converting optical photons collected by the lens from the field of view into electrical signals representing an image of the field of view.

8. The device of claim 7, wherein the imager can be any of a CCD array, a CMOS array, or a thermal imaging device.

9. The device of claim 7, wherein the imager has a resolution in a range of about one million to about 100 million effective pixels per square inch.

10. The device of claim 6, wherein the processor generates the perspective-corrected view by mapping a point (u,v) on an undistorted image plane corresponding to a perspective-corrected portion of a distorted image to a point (x,y) on a plane corresponding to the distorted image, the mapping is provided by the following equations:

$$x=R(\beta_0/(PI/2))\cos(d_0)$$
$$y=R(\beta_0/(PI/2))\sin(d_0)$$
$$t=[Dd+\text{sqrt}(D^2d^2-(u^2+v^2+d^2)(D^2-1))]/(u^2+v^2+d^2)$$
$$\beta_0=\arctan(-D\cos(\beta)+dt\cos(\beta)-vt\sin(\beta), 1)$$
$$\delta_0=\arctan(-D\sin(\beta)+dt\sin(\beta)+vt\cos(\beta), ut)+\delta$$

where $\beta$ and $\delta$ are the zenith and azimuthal angles corresponding to the center of the undistorted image, $\beta_0$ and $\delta_0$ are the zenith and azimuthal angles corresponding to a pixel (u,v) in the undistorted image, d is a magnification factor, D is a level of undistortion, and R is the radius of the fisheye image.

11. The device of claim 10, wherein each of the distorted and undistorted image planes includes a two-dimensional array of pixels providing a digital luminance map corresponding to the image or a perspective-corrected portion of the image, respectively.

12. The device of claim 11, wherein the processor generates the luminance value of a pixel corresponding to the point (u,v) by calculating a weighted average of luminance values of two or more pixels surrounding the point (x,y), if the point (x,y) does not correspond to a pixel on the distorted image plane.

13. A device for providing a perspective-corrected view of at least a portion of a wide angle image, comprising:
    an image-capturing device having a fish-eye lens for generating the wide angle image,
    a processor in communication with the image-capturing device,
    the processor correcting at least a portion of the image for distortions introduced by the fish-eye lens by mapping a point (u,v) on an undistorted image plane corresponding to a perspective-corrected view of the image portion to a point (x,y) on a distorted image plane corresponding to the image in accord with an angle for viewing a section of the hemisphere corresponding to the image portion from a vantage point offset from a center of the hemisphere and a distance between the vantage point and the center of the hemisphere.

14. The device of claim 13, wherein the processor employs the following equations to effect the mapping between the point (u,v) and the point (x,y):

$x = R(\beta_0/(PI/2))\cos(d_0)$ $y = R(\beta_0/(PI/2))\sin(d_0)$ $t = [Dd + \sqrt{D^2 d^2 - (u^2 + v^2 + d^2)(D^2 - 1)}]/(u^2 + v^2 + d^2)$ $\beta_0 = \arctan(-D\cos(\beta) + dt\cos(\beta) - vt\sin(\beta), 1)$ $\delta_0 = \arctan(-D\sin(\beta) + dt\sin(\beta) + vt\cos(\beta), ut) + \delta$ where $\beta$ and $\delta$ are the zenith and azimuthal angles corresponding to the center of the undistorted image, $\beta_0$ and $\delta_0$ are the zenith and azimuthal angles corresponding to a pixel (u,v) in the undistorted image, d is the magnification factor, D is the level of undistortion, and R is the radius of the fisheye image.

15. A method for generating a perspective-corrected view of a portion of a fish-eye image, comprising:

mapping a point (u,v) on an undistorted image plane corresponding to a perspective view of the image portion to a point (x,y) on a distorted image plane corresponding to the fish-eye image according to the following equations:

$x = R(\beta_0/(PI/2))\cos(d_0)$ $y = R(\beta_0/(PI/2))\sin(d_0)$ $t = [Dd + \sqrt{D^2 d^2 - (u^2 + v^2 + d^2)(D^2 - 1)}]/(u^2 + v^2 + d^2)$ $\beta_0 = \arctan(-D\cos(\beta) + dt\cos(\beta) - vt\sin(\beta), 1)$ $\delta_0 = \arctan(-D\sin(\beta) + dt\sin(\beta) + vt\cos(\beta), ut) + \delta$ where $\beta$ and $\delta$ are the zenith and azimuthal angles corresponding to the center of the undistorted image, $\beta_0$ and $\delta_0$ are the zenith and azimuthal angles corresponding to a pixel (u,v) in the undistorted image, d is the magnification factor, D is the level of undistortion, and R is the radius of the fisheye image.

* * * * *